United States Patent
Dile et al.

(10) Patent No.: US 7,788,230 B2
(45) Date of Patent: Aug. 31, 2010

(54) BACKING-UP AND RESTORING FILES INCLUDING FILES REFERENCED WITH MULTIPLE FILE NAMES

(75) Inventors: James Michael Dile, San Jose, CA (US); Joanne T. Nguyen, Saratoga, CA (US); Vadzim Ivanovich Piletski, San Jose, CA (US); James Patrick Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 11/626,271

(22) Filed: Jan. 23, 2007

(65) Prior Publication Data

US 2008/0177807 A1 Jul. 24, 2008

(51) Int. Cl.
*G06F 7/00* (2006.01)
(52) U.S. Cl. .................. 707/650; 707/682
(58) Field of Classification Search .......... 707/204
See application file for complete search history.

(56) References Cited

U.S. PATENT DOCUMENTS

| | | | |
|---|---|---|---|
| 5,649,196 A * | 7/1997 | Woodhill et al. ............ 707/204 |
| 6,279,011 B1 | 8/2001 | Muhlestein | |
| 6,446,085 B1 | 9/2002 | Gusler et al. | |
| 6,560,615 B1 | 5/2003 | Zayas et al. | |
| 7,043,485 B2 | 5/2006 | Manley et al. | |
| 2004/0054697 A1 | 3/2004 | Tsaur et al. | |
| 2004/0186844 A1 | 9/2004 | Muhlestein | |
| 2005/0210080 A1 * | 9/2005 | Saika ..................... 707/204 |
| 2005/0246510 A1 | 11/2005 | Retnamma et al. | |
| 2006/0085679 A1 | 4/2006 | Neary et al. | |
| 2006/0179083 A1 | 8/2006 | Kulkarni et al. | |
| 2006/0190505 A1 | 8/2006 | DeMaio et al. | |
| 2007/0022117 A1 * | 1/2007 | Keohane et al. ............. 707/8 |

FOREIGN PATENT DOCUMENTS

CN 1266234 9/2000

OTHER PUBLICATIONS

First Office Action from Chinese Patent Office , dated Jun. 5, 2009, for Application No. CN 2008100029288, 7 pgs.
Patent Abstract for CN 1266234, published Sep. 13, 2000, 1 pg.
Chundi et al., "Using Active Clients to Minimize Replication in Primary-Backup Protocols", IEEE, 1996, pp. 96-102.
Microsoft,"WIndows File Protection and Windows", Dec. 2001, pp. 1-6, [retrieved online Jan. 6, 2007], http://www. microsoft.com/whdc/archive/wfp.mspx?pf=true.

(Continued)

*Primary Examiner*—Apu M Mofiz
*Assistant Examiner*—Cindy Nguyen
(74) *Attorney, Agent, or Firm*—David W. Victor; Konrad Raynes and Victor LLP

(57) ABSTRACT

Provided are a method, system, and article of manufacture for backing-up and restoring files including files referenced with multiple file names. Files to backup are determined. A determination is made from the files to backup files referenced with multiple names. An entry is created for each file to backup in a backup directory indicating file attributes and each name used to reference the file. The determined files and the backup directory are backed-up.

18 Claims, 5 Drawing Sheets

OTHER PUBLICATIONS

Microsoft,"WIndows NT Backup and Hard Links", Nov. 2006, p. 1, [retrieved online Jan. 6, 2007], http://www.support.microsoft.com/kb/106166.

Microsoft,"Application Compatibility Notes for Backup and Recovery in Windows Vista and Longhorn Server", Nov. 2006, pp. 1-5, [retrieved online Jan. 6, 2007], http://www.msdn2.microsoft.com/en-us/library/bb188738(d=printer).aspx.

Microsoft,"FindFirstFileNameW", 2007, p. 1, [retrieved online Jan. 6, 2007], http://www.msdn2.microsoft.com/en-us/library/aa364421(d=printer).aspx.

Microsoft,"System File Protection and Windows Me",Dec. 2001, pp. 1-4, [retrieved online Jan. 6, 2007], http://www.microsoft.com/whdc/archive/WinME_sfp.mspx?pf=true.

Wikipedia,"Symbolic Link", pp. 1-3, [retrieved online Jan. 17, 2007], http://www.en.wikipedia.org/w/index.php?title=Symbolic_link&printable=yes.

Wikipedia,"Hard Link", pp. 1-3, [retrieved online Jan. 17, 2007], http://www.en.wikipedia.org/w/index.php?title=Hard_link&printable=yes.

IBM Corp.,"IBM TIvoli Storage Manager for Macintosh Backup-Archive Client Installation and User's Guide", pp. 1-3, [retrieved onlineJan. 7, 2007], http://publib.boulder.ibm.com/tividd/td/TSMC/GC32-0787-02/en_US....

IBM Corp., "Deploying the Tivoli Storage Manager Client in a Windows 2000 Environment", Apr. 2001, pp. 1-190, Document No. SG24-6141-00.

* cited by examiner

Backup Object

Backup Directory Entry

BACKING-UP AND RESTORING FILES INCLUDING FILES REFERENCED WITH MULTIPLE FILE NAMES

BACKGROUND OF THE INVENTION

1. Field of the Invention

The present invention relates to a method, system, and article of manufacture for backing-up and restoring files including files referenced with multiple file names.

2. Description of the Related Art

Certain backup programs are designed to backup operating system state files, comprising those files required by the operating system to operate, such as dynamic link library (DLL) files, etc. The purpose of such backup programs is to backup those files needed to restore the operating system state to the state at the time of backup. The Tivoli® Storage Manager (TSM) backup archive client may backup all system state components in a single object to provide a consistent point-in-time snapshot of the system state. (Tivoli is a registered trademark of International Business Machines Corporation in the United States and other countries) On a Microsoft® Windows Server® system, the system state components to backup include active directory, system volume, COM+ database files, registry files, system and boot files. (Microsoft and Windows Server are registered trademarks of the Microsoft Corporation in the United States and other countries) The TSM backup archive client may transfer the object including the system state files to a TSM backup server that manages backup objects for multiple clients.

In certain embodiments, multiple names may be used to reference a file. For instance, in certain Microsoft® Windows® operating systems, a file may have multiple names that reference the file, referred to as hard links and soft or symbolic links. Further, Windows Vista™ System Backup has the capability to backup an image and restore files having multiple names by restoring only one copy of the file from the image. (Windows Vista is a trademark of the Microsoft Corporation in the United States and other countries).

There is a need in the art for improved techniques for backing up files, including files which may be referenced by multiple file names.

SUMMARY

Provided are a method, system, and article of manufacture for backing-up and restoring files including files referenced with multiple file names. Files to backup are determined. A determination is made from the files to backup files referenced with multiple names. An entry is created for each file to backup in a backup directory indicating file attributes and each name used to reference the file. The determined files and the backup directory are backed-up.

DETAILED DESCRIPTION

Figure 1:
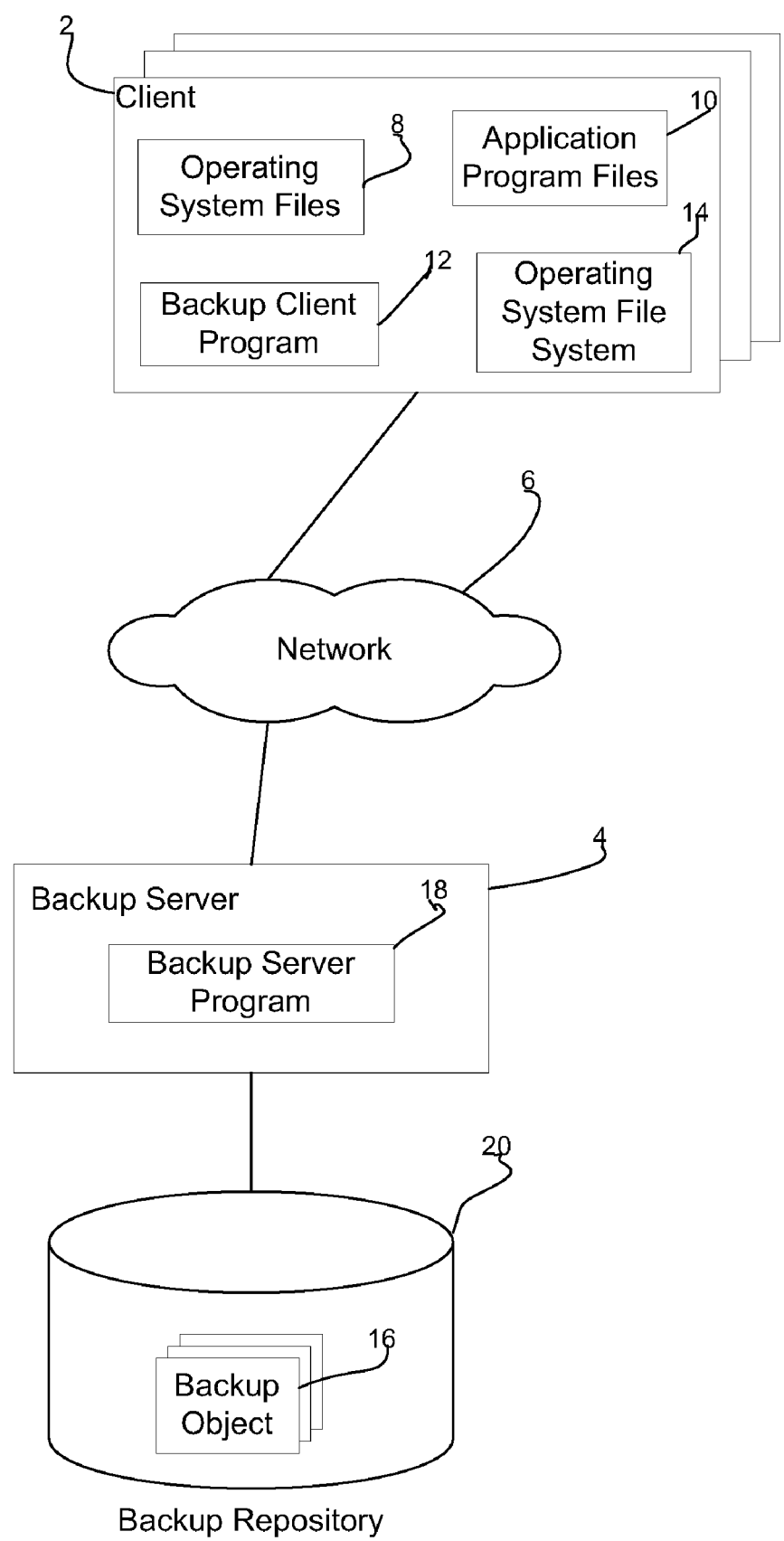
FIG. 1 illustrates an embodiment of a network backup computing environment.

FIG. 1 illustrates an embodiment of a network computing environment. One or more clients 2 communicate with a backup server 4 over a network 6. A client 2 includes operating system files 8, application program files 10, a backup client program 12, and file system 14, such as a hierarchical file system. The operating system files 8, including user settings, for different clients 2 may change over time. The operating system files 8 represent the "system state". The backup client program 12 gathers files to backup and includes them in a backup object 16, which is then transferred to a backup server program 18 on the backup server 4. The backup client program 12 communicates backup related requests to the backup server program 18. The backup server program 18 maintains backup objects 16 from different client 2 systems in a backup repository 20

The clients 2 that communicate with the backup server 4 may comprise suitable computational devices known in the art, such as servers, desktop computers, workstations, mainframes, hand held computing devices, telephony devices, etc. The backup server 4 may comprise a suitable server system known in the art. The backup repository 20 may be implemented in a storage system known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc. The network 6 may comprise a Wide Area Network (WAN), Local Area Network (LAN), Storage Area Network (SAN), wireless network, the Internet, an Intranet, peer-to-peer network, etc.

Figure 2:
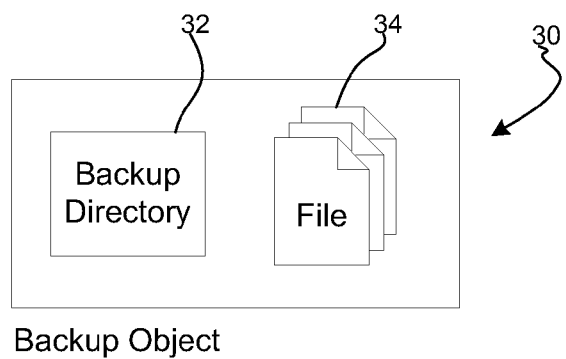
FIG. 2 illustrates an embodiment of a backup object.

FIG. 2 illustrates an embodiment of an instance of a backup object 30, such as backup object 16, including a backup directory 32 and backed-up files 34, where the backup directory 32 includes an entry for each backed-up file 34. The backup object may 30 comprise any suitable object known in the art for storing multiple component files and objects, such as a large binary object (BLOB) generated using a compression program known in the art, such as the ZIP and TAR data compression and file formats. In one embodiment, the backed-up files 34 comprise operating system files 8 whose restoration can restore the client operating system environment to the system state at the time of the backup operation. The backed-up files 34 may also comprise other types of files, such as application files, data, etc. The backup directory 32 may comprise an index or table of contents providing entries or information for each backed-up file 34.

Figure 3:
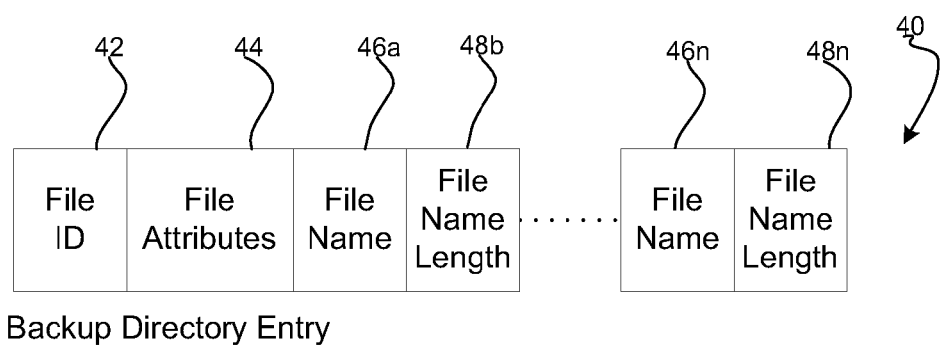
FIG. 3 illustrates an embodiment of a backup directory entry.

FIG. 3 illustrates an instance of a backup directory entry 40 generated for a backed-up file including: a file identifier (ID) 42 comprising a unique identifier of the file or index value of the file in the file system 14; file attributes 44, such as file size, creation time, last access time, last write time, etc.; and for each file name referencing the file a file name 46a . . . 46n and file name length 48a . . . 48n. In this way, the backup directory entry 40 provides information on the one or more file names referencing a file in the file directory 14. The one or more file names referencing a same file may comprise hard links or soft or symbolic links.

Figure 4:
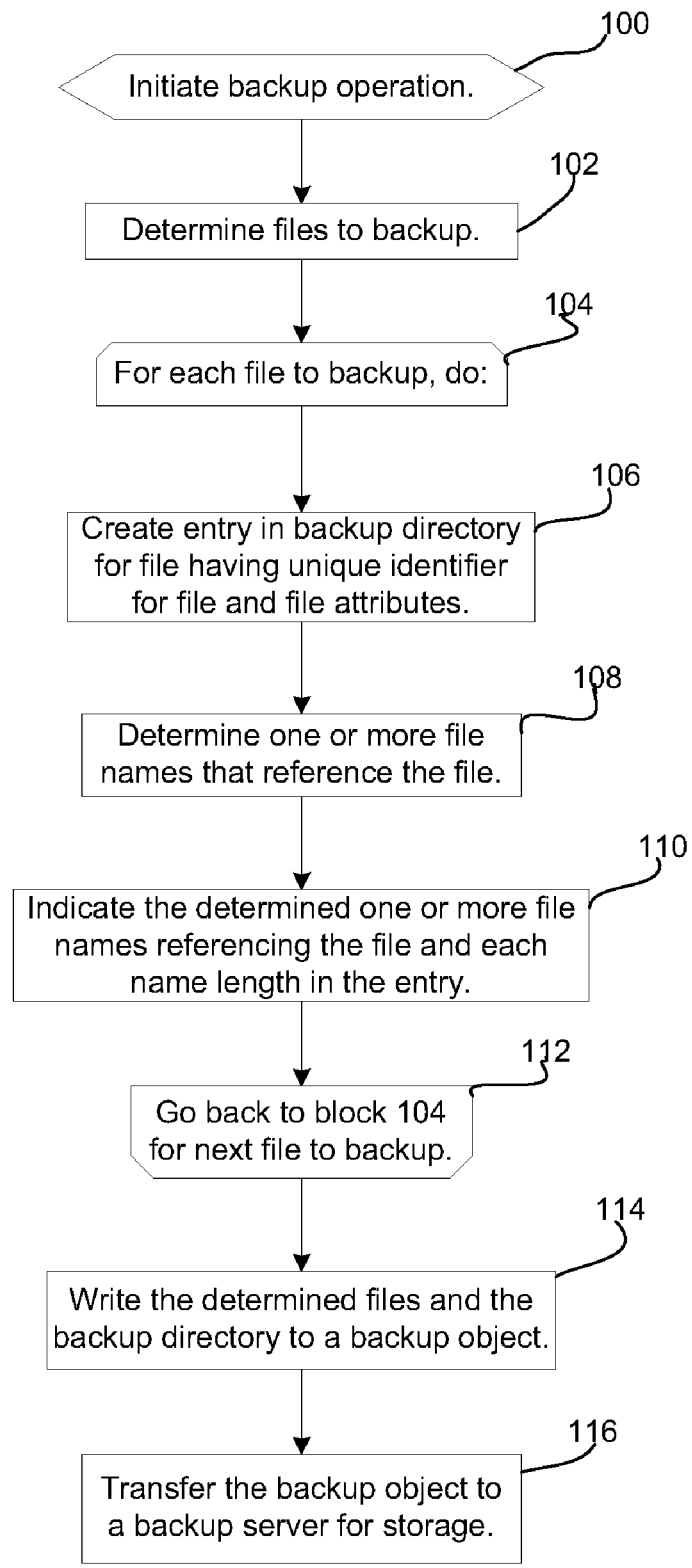
FIG. 4 illustrates an embodiment of backup operations.

FIG. 4 illustrates an embodiment of operations performed by the backup client program 12 to backup files into a backup object 30. Upon initiating (at block 100) backup operations, the backup client program 12 determines (at block 102) files to backup, such as files 34. As discussed, in one embodiment, the backup client program 12 may only backup system files representing a system state of the client operating system. In alternative embodiments, the files to backup may comprise application program files 10, data files, etc. For each file to backup (at blocks 104-112), the backup client program 12 performs the operations at blocks 106-110. At block 106, the backup client program 12 creates an entry 40 (FIG. 3) in the backup directory 32 for a file having the unique identifier 42 for the file and the file attributes 44. The backup client program 12 further determines (at block 108) one or more file names that reference the file. In one embodiment, the backup client program 12 may use operating system Application Programming Interfaces (APIs) to determine the one or more file names that reference the file. For instance, with certain Microsoft® Windows® operating systems, the FindFirstFileNameW API called with the file name returns a file handle. The FindNextFileNameW API may then be called with the returned file handle to obtain the file names that reference or have "hard links" to the file. In an alternative embodiment, the client backup client program 12 can determine the file names that reference a file by scanning the file directory 14 to determine a list of file names that reference a same file identifier, and use this temporarily constructed list to generate backup data entries 40.

The backup client program 12 then indicates (at block 110) the determined one or more file names referencing the file and each name length in the entry 40 being constructed. After generating backup directory entries 40 for each file to backup (at block 112), the backup client program 12 writes (at block 114) the determined files 34 and the backup directory 32 to a backup object 30. The backup client program 12 transfers (at block 116) the generated backup object 30 to the backup server program 18 to store in the backup repository 20.

In one embodiment, the backup client program 12 may create the backup object 30 in a local memory or storage of the client 2 and then transfer the completed backup object 30 to the backup server program 18. In an alternative embodiment, the backup client program 12 may stream the contents of the backup object 30 being generated to the backup server program 18 to avoid having to read and write the backup object to local storage.

With the described operations of FIG. 4, the backup object includes self-contained information in the form of the backup directory 32 that maintains information on multiple names that may reference a single file. Further, in certain embodiments, only one instance of a file having multiple file names is included in the backup object 30.

Figure 5:
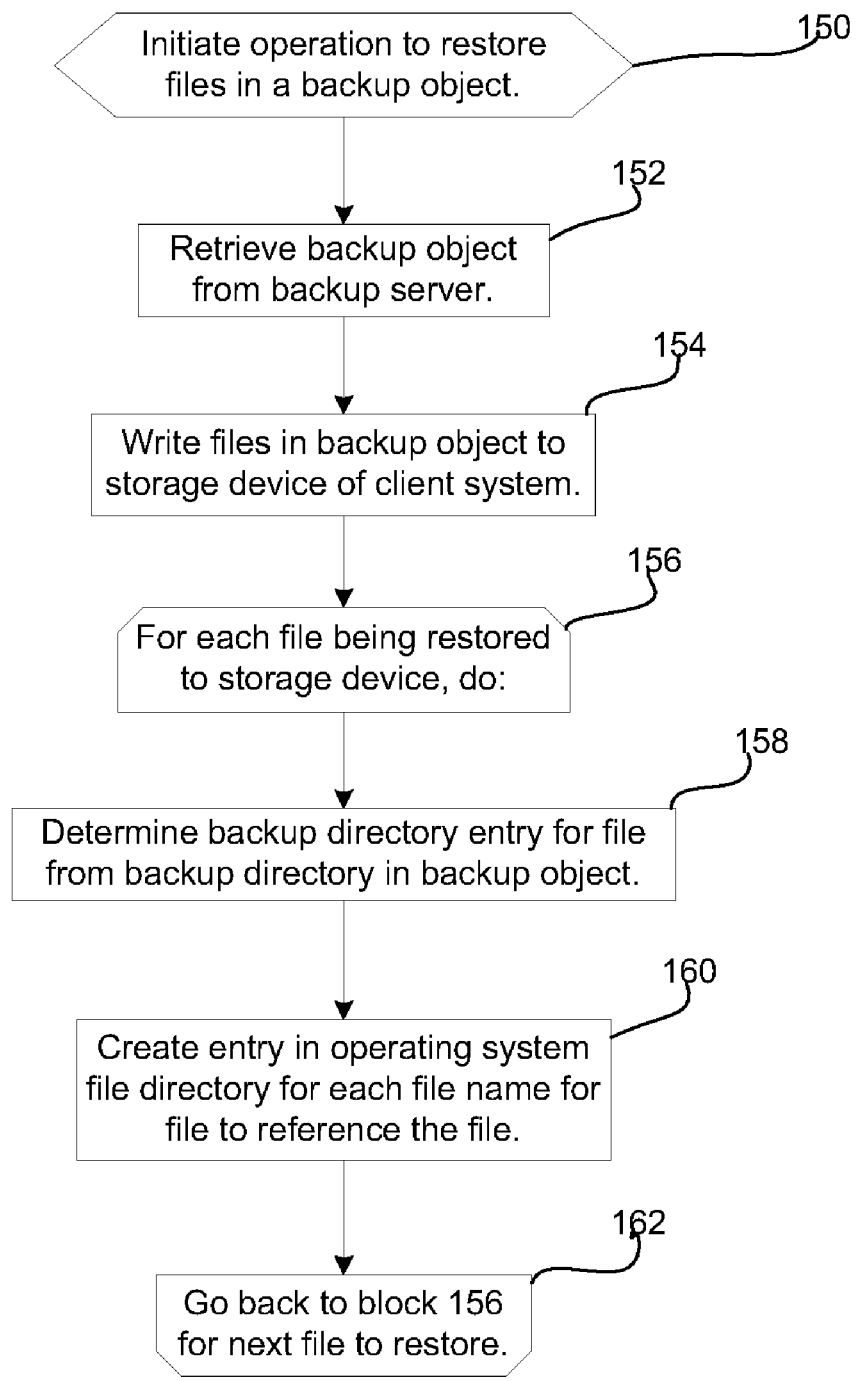
FIG. 5 illustrates an embodiment of restore operations.

FIG. 5 illustrates an embodiment of operations performed by the backup client program 12 to restore the files in the backup object 30 to the client 2. As discussed, this restoration may restore the system state files to return the operating system state at the client 2 to the system state at the time the backup files 34 in the backup object 30 were gathered. Upon initiating (at block 150) a restore operation, the backup client program 12 retrieves (at block 152) a backup object 30 from the backup server program 18. The user of the backup client program 12 may utilize a user interface to view accessible backup objects 16 in the repository 20 to select one to restore. Upon receiving the backup object 30, the backup client program 12 writes (at block 154) the files 34 to a storage device of the client 2 storing the operating system files 8 for the client. The backup client program 12 performs (at blocks 156-162) the operations at blocks 158 and 160 for each file being restored from the backup object 30. For each file, the backup client program 12 determines (at block 158) the backup directory entry 40 (FIG. 4) for the file from the backup directory 32 in the received backup object 30. The backup client program 12 then creates (at block 160) an entry in the file system 14 for each file name 46a ... 46n indicated in the entry 40 that references that file.

With the described operations of FIG. 5, only one instance of a file is restored, or written to the client 2 storage. Further, the backup directory 32 provides the information needed to create one or more entries in the file system 14 for the one or more file names that reference the file without having to write multiple instances of the file to the client 2 local storage.

Described embodiments provide techniques to backup and restore files to a backup object in a manner that avoids writing multiple instances of a file referenced with multiple file names to the backup object and that avoids restoring multiple instances of the file referenced with multiple file names. With the described embodiments, only one instance of a file is written to a backup object and the information on the multiple file names for a file are maintained in a backup directory 34 for the backup object. For the restore operation, the backup directory is used to write only one instance of the file back to the client and then update the client file system 14 to include the multiple names that reference the file.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 6:
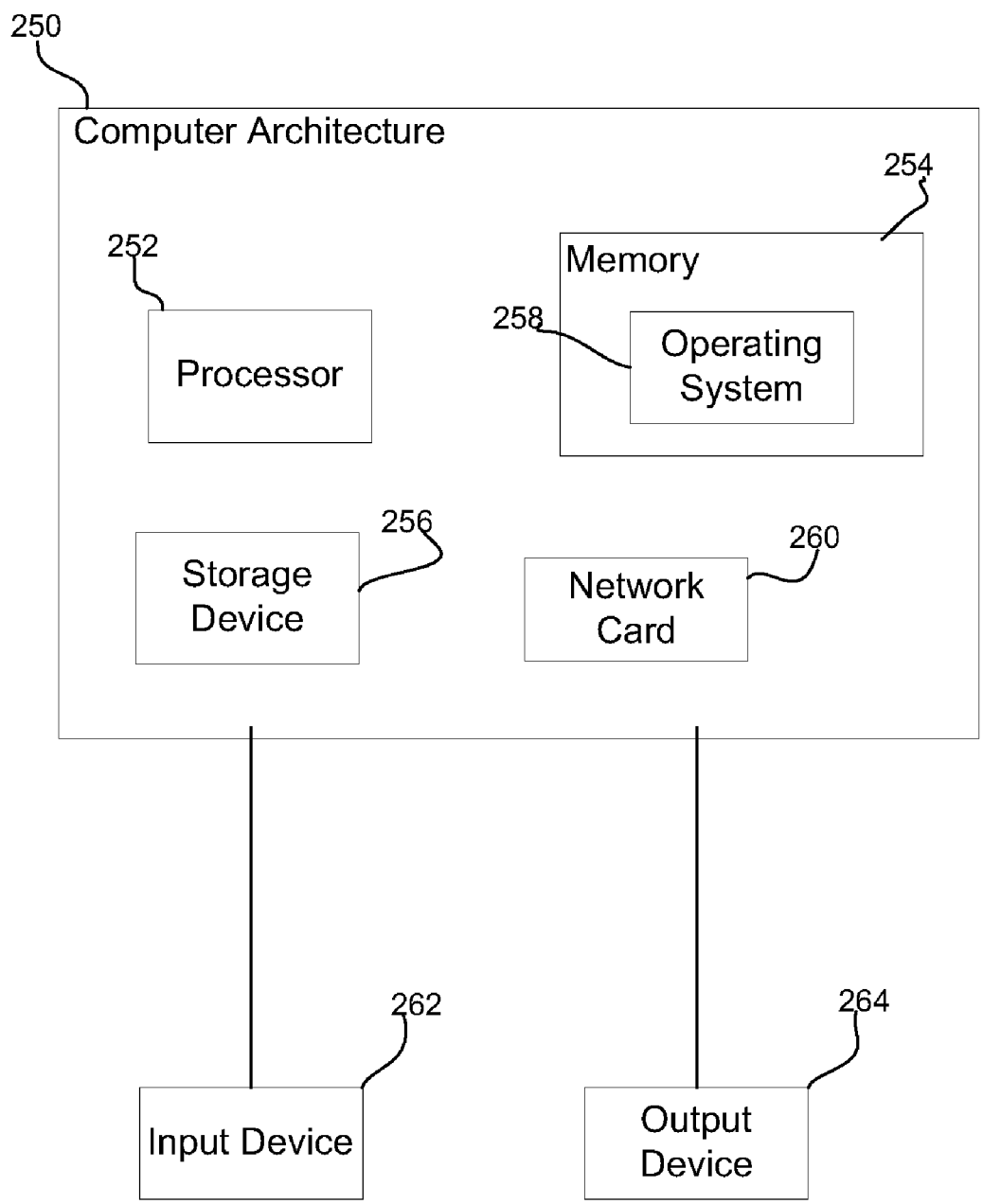
FIG. 6 illustrates an embodiment of a computer architecture that may be used with the systems in FIG. 1.

FIG. 6 illustrates one implementation of a computer architecture 250 that may be implemented at the clients 2 and the backup server 4. The architecture 250 may include a processor 252 (e.g., a microprocessor), a memory 254 (e.g., a volatile memory device), and storage 256 (e.g., a non-volatile storage, such as magnetic disk drives, optical disk drives, a tape drive, etc.). The storage 256 may comprise an internal storage device or an attached or network accessible storage. Programs, including an operating system 258, device drivers and application programs, in the storage 256 are loaded into the memory 254 and executed by the processor 252 in a manner known in the art. The architecture further includes a network card 260 to enable communication with a network. An input device 262 is used to provide user input to the processor 262, and may include a keyboard, mouse, pen-stylus, microphone, touch sensitive display screen, or any other activation or input mechanism known in the art. An output device 264 is capable of rendering information transmitted from the processor 252, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The differential backup object 30 shown in FIG. 2 may be implemented as a single object or file or as multiple files or objects.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
   determining files in a file system to backup in a computer readable storage medium;
   determining from the files to backup files referenced with multiple names in the file system, wherein the files in the file system have a unique identifier and one or more names referencing the file in the file system;
   creating for each file to backup an entry in a backup directory indicating file attributes and each name used to reference the file in the file system, wherein the entry for a file referenced with multiple names indicates the multiple names that reference the file; and
   backing-up the determined files and the backup directory by writing the determined files and the backup directory to a backup object, wherein only one instance of files in the file system referenced with multiple file names are backed-up in the backup object.

2. The method of claim 1, further comprising:
   initiating an operation to restore the backed-up files to a storage device;
   writing the backed-up files to the storage device; and
   using the backup directory to update a file system to indicate all names for each backed-up file written to the storage device, wherein multiple file names that reference one file, as indicated in the backup directory, are indicated in the file system to reference the file.

3. The method of claim 2, wherein using the backup directory to update the file directory comprises:
   determining from the backup directory entry for each file written to the storage device each name of the file; and
   creating in the file system each determined name for each file written to the storage device and a link from the name to the file.

4. The method of claim 1, wherein the determined files to backup comprise system files used by the operating system to perform operating system operations and that represent a system state of the operating system.

5. The method of claim 1, further comprising:
   transferring the backup object to a backup server for storage.

6. The method of claim 1, wherein backing-up the determined files and the backup directory comprises:
streaming the determined files and the backup directory to the backup object on a backup server.

7. The method of claim 1, further comprising:
initiating an operation to restore the backed-up files in the backup object to a storage device;
accessing the backed-up files from the backup object;
writing the accessed backed-up files to the storage device; and
using the backup directory to update a file system to indicate all names for each backed-up file written to the storage device, wherein only one instance of files referenced with multiple names is restored.

8. A system, comprising:
a processor;
a file system including information on files; and
a backup client program executed by the processor to perform operations, the operations comprising:
determining files in the file system to backup;
determining from the files to backup files referenced with multiple names in the file system, wherein the files in the file system have a unique identifier and one or more names referencing the file in the file system;
creating for each file to backup an entry in a backup directory indicating file attributes and each name used to reference the file in the file system, wherein the entry for a file referenced with multiple names indicates the multiple names that reference the file; and
backing-up the determined files and the backup directory by writing the determined files and the backup directory to a backup object, wherein only one instance of files in the file system referenced with multiple file names are backed-up in the backup object.

9. The system of claim 8, further comprising:
a storage device;
wherein the operations performed in response to executing the backup client program further comprise:
initiating an operation to restore the backed-up files to the storage device;
writing the backed-up files to the storage device; and
using the backup directory to update the file system to indicate all names for each backed-up file written to the storage device, wherein multiple file names that reference one file, as indicated in the backup directory, are indicated in the file system to reference the file.

10. The system of claim 9, wherein using the backup directory to update the file directory comprises:
determining from the backup directory entry for each file written to the storage device each name of the file; and
creating in the file system each determined name for each file written to the storage device and a link from the name to the file.

11. The system of claim 9, wherein the operations performed in response to executing the backup client program further comprise:
initiating an operation to restore the backed-up files in the backup object to the storage device;
accessing the backed-up files from the backup object;
writing the accessed backed-up files to the storage device; and
using the backup directory to update the file system to indicate all names for each backed-up file written to the storage device, wherein only one instance of each file referenced with multiple names is restored.

12. An article of manufacture comprising a computer readable storage medium implementing code executed to perform backup operations with respect to files indicated in a file system that are stored in a storage device, wherein the code is enabled to cause operations, the operations comprising:
determining files in the file system to backup;
determining from the files to backup files referenced with multiple names in the file system, wherein the files in the file system have a unique identifier and one or more names referencing the file in the file system;
creating for each file to backup an entry in a backup directory indicating file attributes and each name used to reference the file in the file system, wherein the entry for a file referenced with multiple names indicates the multiple names that reference the file; and
backing-up the determined files and the backup directory by writing the determined files and the backup directory to a backup object, wherein only one instance of files in the file system referenced with multiple file names are backed-up in the backup object.

13. The article of manufacture of claim 12, wherein the operations further comprise:
initiating an operation to restore the backed-up files to the storage device;
writing the backed-up files to the storage device; and
using the backup directory to update the file system to indicate all names for each backed-up file written to the storage device, wherein multiple file names that reference one file, as indicated in the backup directory, are indicated in the file system to reference the file.

14. The article of manufacture of claim 13, wherein using the backup directory to update the file directory comprises:
determining from the backup directory entry for each file written to the storage device each name of the file; and
creating in the file system each determined name for each file written to the storage device and a link from the name to the file.

15. The article of manufacture of claim 12, wherein the determined files to backup comprise system files used by the operating system to perform operating system operations and that represent a system state of the operating system.

16. The article of manufacture of claim 12, wherein the code is further capable of causing communication with a backup server, wherein the operations further comprise:
transferring the backup object to the backup server for storage.

17. The article of manufacture of claim 12, wherein the code is further capable of causing communication with a backup server, and wherein backing-up the determined files and the backup directory comprises:
streaming the determined files and the backup directory to the backup object on the backup server.

18. The article of manufacture of claim 12, wherein the operations further comprise:
initiating an operation to restore the backed-up files in the backup object to the storage device;
accessing the backed-up files from the backup object;
writing the accessed backed-up files to the storage device; and
using the backup directory to update the file system to indicate all names for each backed-up file written to the storage device, wherein only one instance of each file referenced with multiple names is restored.

* * * * *